United States Patent
Hoffman

(10) Patent No.: US 6,445,763 B1
(45) Date of Patent: Sep. 3, 2002

(54) METHODS AND APPARATUS FOR APPLICATION SPECIFIC COMPUTED TOMOGRAPHIC RADIATION DETECTION

(75) Inventor: David M. Hoffman, New Berlin, WI (US)

(73) Assignee: General Electric Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/721,321

(22) Filed: Nov. 22, 2000

(51) Int. Cl.[7] ............................................. H04N 5/335
(52) U.S. Cl. ........................................ 378/19; 348/302
(58) Field of Search ................. 378/98.8, 19; 348/287, 348/302–308

(56) References Cited

U.S. PATENT DOCUMENTS

| | | |
|---|---|---|
| 4,709,259 A | * 11/1987 | Suzuki ........................ 348/280 |
| 5,241,576 A | 8/1993 | Lonn |
| 5,430,784 A | 7/1995 | Ribner et al. |
| 5,732,118 A | 3/1998 | Hsieh |
| 5,799,057 A | 8/1998 | Hoffman et al. |
| 6,134,301 A | 10/2000 | Mruzek et al. |
| 6,307,908 B1 | 10/2001 | Hu |

* cited by examiner

*Primary Examiner*—David P. Porta
(74) *Attorney, Agent, or Firm*—Carl B. Horton, Esq.; Armstrong Teasdale LLP

(57) ABSTRACT

One aspect of the present invention is a detector array for an imaging system, the detector array having a plurality of electrically conductive busses, a plurality of detector elements arranged in rows extending in an x-direction and columns extending in a z-direction, a plurality of scan lines, each operatively coupled to at least one of the detector elements so that electrical activation of one of the scan lines transfers an electrical charge from the detector element onto one of the busses; a plurality of read-out lines; and an interconnection matrix operatively coupled to the busses and the read-out lines and electrically reconfigurable to transfer electrical charges from the busses selectively to the read-out lines.

22 Claims, 4 Drawing Sheets

METHODS AND APPARATUS FOR APPLICATION SPECIFIC COMPUTED TOMOGRAPHIC RADIATION DETECTION

BACKGROUND OF THE INVENTION

This invention relates generally to methods and apparatus for detecting and measuring radiation in computed tomography (CT) imaging and other imaging systems, and more particularly to high-resolution radiation detector arrays having programmable outputs.

In at least one known single slice CT system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon a one row array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector.

In an axial scan, the projection data is processed to construct an image that corresponds to a two dimensional slice taken through the object. One method for reconstructing an image from a set of projection data is referred to in the art as the filtered back projection technique. This process converts that attenuation measurements from a scan into integers called "CT numbers" or "Hounsfield units", which are used to control the brightness of a corresponding pixel on a cathode ray tube display.

To reduce the total scan time, a "helical" scan may be performed. To perform a "helical" scan, the patient is moved while the data for the prescribed volume coverage is acquired. Such a system generates a single helix from a one fan beam helical scan. The helix mapped out by the fan beam yields projection data from which images in each prescribed slice may be reconstructed.

In at least one known CT imaging system, a multi-row detector array is used. Each row of the detector (or selected combinations of adjacent rows) can be configured to acquire attenuation measurements of different, parallel imaging planes or "slices" of the object or patient being scanned. However, because of the total number of attenuation measurements that must be processed when a multi-slice scan is performed, a very high bandwidth data path must be provided in multi-slice CT imaging systems. The high-bandwidth data path is a communication path provided between the detector array and an image reconstructor. The communication path includes a data acquisition system (DAS), and is limited by one or more of the number of communication signal lines from the detector array to the DAS, a processing capability of the DAS, and a signal bandwidth (measured, for example, in bytes per second) from the DAS to the image reconstructor. This maximum limit of the communication path is referred to as the maximum bandwidth limit, or maximum data bandwidth.

As a result of bandwidth limitations, multi-slice CT imaging systems are limited in the number of slices of imaging data that can be acquired in a scan. For example, in one imaging system in which a sixteen-row detector array is provided, no more than four slices of attenuation data are acquired during a scan. (When all sixteen detector rows are used, measurements from four adjacent detector rows are inseparably combined for each slice prior to acquisition of the measurements.) Thus, known CT detector arrays have relatively limited resolution, or only a few rows with high resolution. (The smallest detector element in one known system is about 1 mm by 2 mm.)

In one known non-rotating digital radiographic system, images are produced by detector arrays having approximately 100 times the number of detector elements per unit area as in known CT imaging systems. Detector arrays having a similar resolution in a rotating imaging system would provide the capability of scanning various body parts at resolutions best suited for clinical needs. However, the limited bandwidth available for data transmission in rotating imaging systems has prevented the use of high-resolution scanned detector arrays.

It would therefore be desirable to provide scannable, high-resolution detector arrays suitable for use in rotating imaging systems. It would also be desirable to provide CT imaging systems having scannable detector elements that do not require extremely high bandwidth. It would further be desirable to provide methods and apparatus for operating a detector array that can selectively provide a high resolution for rotating imaging systems.

BRIEF SUMMARY OF THE INVENTION

One embodiment of the present invention is therefore a detector array for an imaging system, the detector array having a plurality of electrically conductive busses, a plurality of detector elements arranged in rows extending in an x-direction and columns extending in a z-direction, a plurality of scan lines, each operatively coupled to at least one of the detector elements so that electrical activation of one of the scan lines transfers an electrical charge from the detector element onto one of the busses; a plurality of read-out lines; and an interconnection matrix operatively coupled to the busses and the read-out lines and electrically reconfigurable to transfer electrical charges from the busses selectively to the read-out lines.

This embodiment provides a scannable, high-resolution detector array for a rotating imaging system that does not require extremely high bandwidth, and that can selectively provide high resolution, for example, to particular areas of a patient.

DETAILED DESCRIPTION OF THE INVENTION

Figure 1:
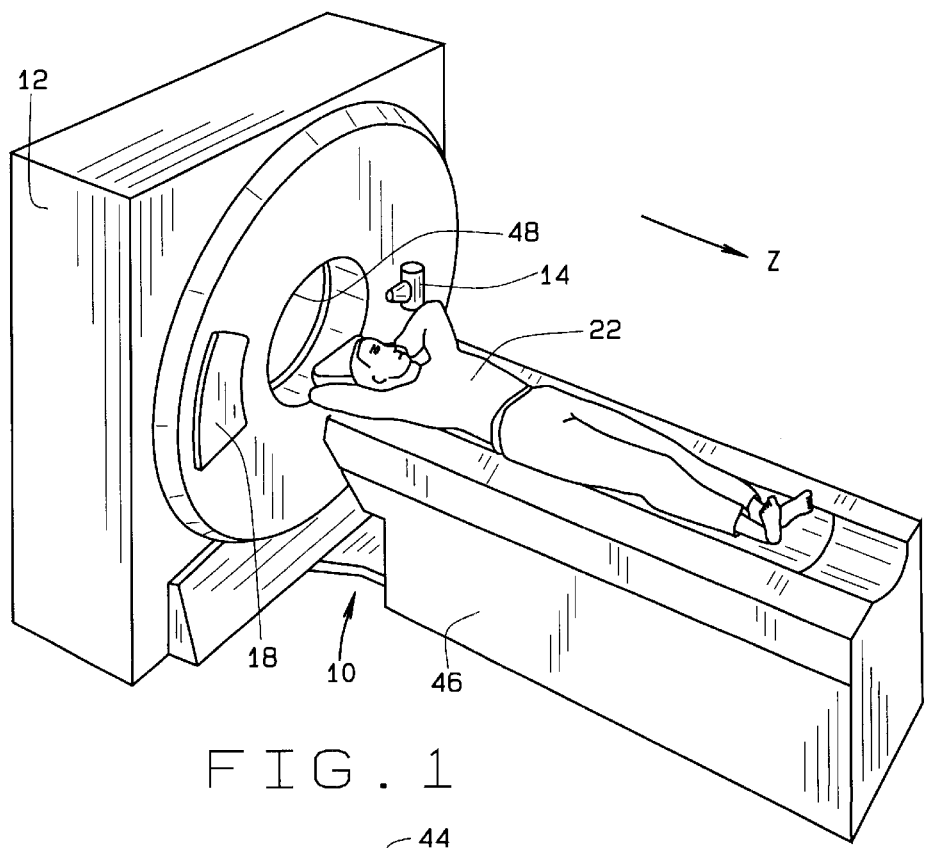
FIG. 1 is a pictorial view of a CT imaging system.
Figure 2:
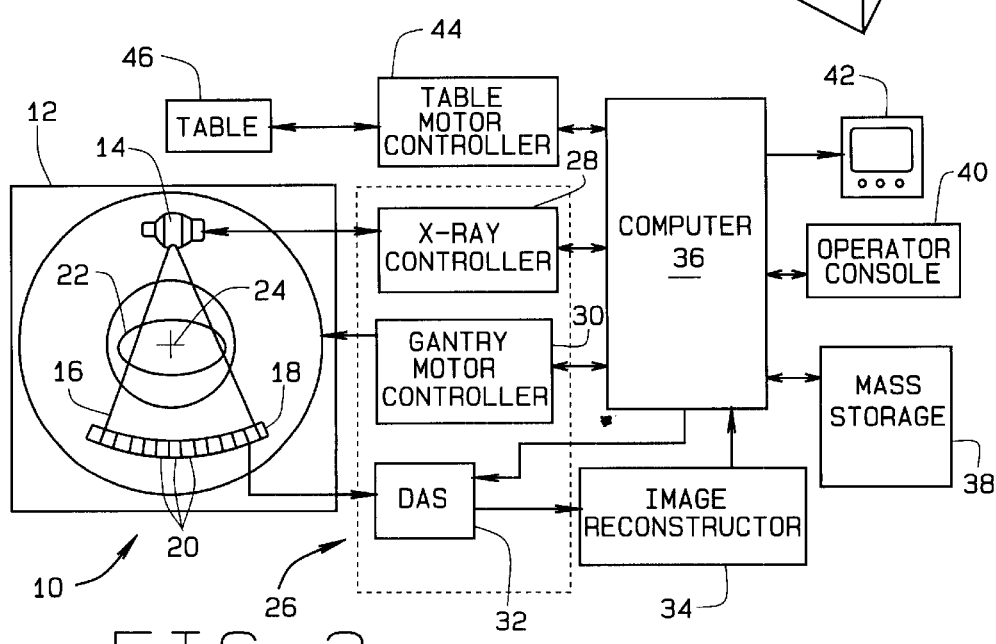
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example a medical patient. Detector array 18 may be fabricated in a single slice or multi-slice configuration. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

An axis of rotation of gantry 12 defines a z-axis for CT system 10. In this description, any direction parallel to the z-axis is called a "z-direction." In one embodiment of the present invention, detector array 18 has an arc-shaped cross-section in a plane transverse to the z-axis. Traditionally, illustrations of a surface of detector array 18 facing radiation source 14 are flat projections of the surface of detector array 18 onto a plane. Thus, it is traditional to refer to detector array 18 as having rows of detector elements 20 extending in an x-direction (i.e., transverse to the z-direction). Detector elements 20 from different rows can be said to be arranged in columns extending in the z-direction. The use of this terminology is intended to encompass detector arrays 18 that are curved as well as flat, for example, arc-shaped detector array 18 of FIG. 2. In addition, in some CT imaging systems 10 performing some types of scans (particularly helical scans), it may be advantageous to provide detector arrays having rows slightly tilted from the x-direction and/or columns skewed from alignment with the z-direction. Terminology describing a detector array 18 having rows of detector elements 20 extending in the x-direction and columns extending in the z-direction as used in the description and claims is intended to encompass such embodiments.

Figure 3:
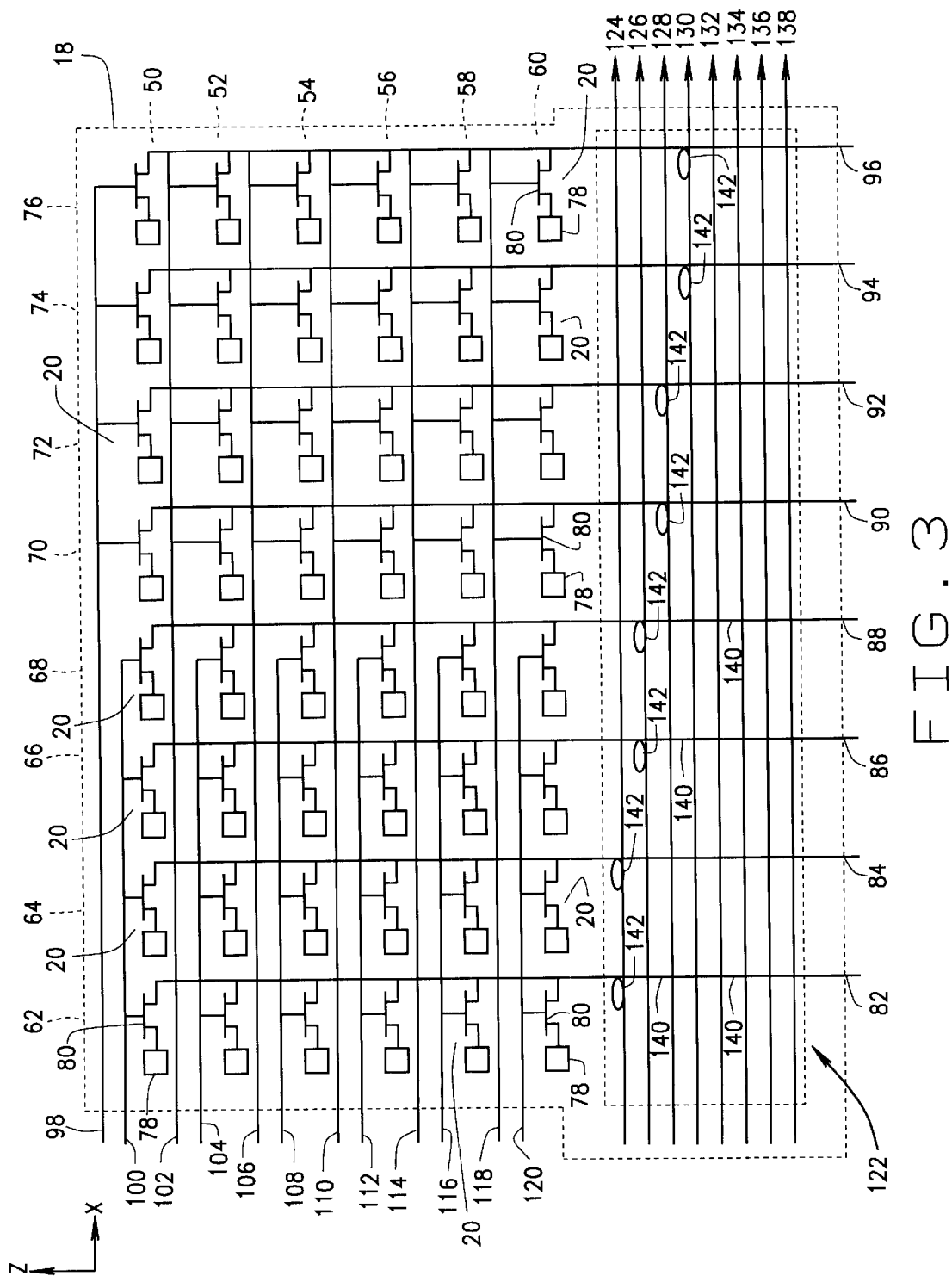
FIG. 3 is a schematic representation of a detector array of the present invention.

In one embodiment and referring to FIG. 3 (drawn using the conventions described above), detector array 18 is a multi-row array of detector elements 20 having rows 50, 52, 54, 56, 58, and 60 extending in an x-direction and columns 62, 64, 66, 68, 70, 72, 74, and 76 extending in a z-direction. Each detector element 20 includes a sensing element 78 and a switch 80 coupling the sensing element to a bus 82, 84, 86, 88, 90, 92, 94 or 96. When exposed to radiation, sensing element 78 develops and stores a charge indicative of an amount of the impinging radiation. This charge is thus indicative of attenuation of a portion of radiation beam 16 passing through object or patient 22. Switch 80 of each detector element 20 is operatively coupled to a scan line 98, 100, 102, 104, 106, 108, 110, 112, 114, 116, 118, or 120, so that activation of the coupled scan line transfers the electrical charge developed by sensing element 78 onto the electrically conductive bus coupled to it. An analog interconnection matrix 122 is operatively coupled to electrically conductive busses 82, 84, 86, 88, 90, 92, 94 and 96 and a plurality of read-out lines 124, 126, 128, 130, 132, 134, 136, 138. Each crosspoint 140 of interconnection matrix 122 has a separately controllable switch, such as a field effect transistor (FET) that can be switched into a conductive state to electrically link a bus with a read-out line. When the switch is activated (or scanned), an analog signal is coupled from an associated bus line to an associated read-out line. (An activated switch is considered to be "on." Individual switches are not shown in FIG. 3. However, for purposes of illustration, a selection of switches that might be turned on electrically by computer 36 of imaging system 10 are represented in FIGS. 3 and 4 by a small oval 142 at corresponding crosspoints 140.)

In the above manner, matrix 122 is operatively coupled to busses 82, 84, 86, 88, 90, 92, 94 and 96 and to read out lines 124, 126, 128, 130, 132, 134, 136, 138 and is electrically reconfigurable to transfer electrical charges from busses 82, 84, 86, 88, 90, 92, 94 and 96 selectively to read-out lines 124, 126, 128, 130, 132, 134, 136, 138. Read-out lines 124, 126, 128, 130, 132, 134, 136, 138 couple analog signals indicative of radiation attenuation to data acquisition system 32 of imaging system 10. Elements 20 of detector array 18 are scannable, and interconnection matrix 122 is a reconfigurable switch that is operatively coupled to detector elements 20 and a set of read-out lines (e.g., 124, 126, 128, 130, 132, 134, 136, 138) to selectively and simultaneously multiplex combined signals from different groups of scanned detector elements on each of a selected subset of the read-out lines when array 18 of detector elements 20 is scanned.

Detector array 18 embodiments of the present invention are scalable, so that some embodiments have hundreds of rows and thousands of columns and have the same or larger overall dimensions as those of known CT detector arrays 18. Thus, some embodiments of detector array 18 contain millions of detector elements 20. FIG. 3 should be considered as illustrative of a representative portion of such embodiments. In one embodiment, detector elements 20 are adjacent rectangular sensing elements having dimensions of 0.1 mm in the x-direction by 0.2 mm in the z-direction. In some embodiments suitable for special purpose imaging applications, detector array 18 has more rows of detector elements 20 than columns.

Figure 4:
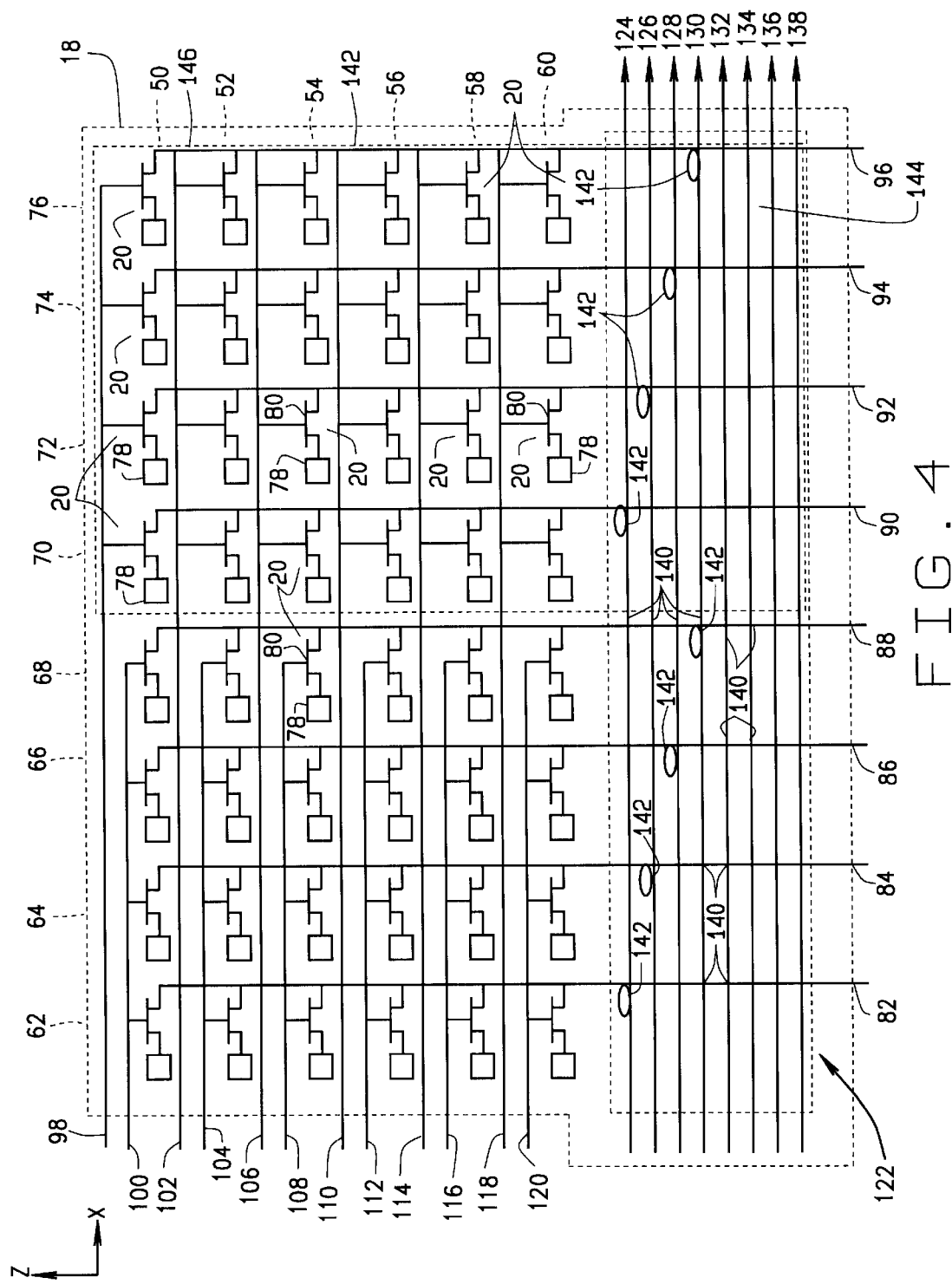
FIG. 4 is a schematic representation of the detector array of FIG. 3, also illustrating an electrical reconfiguration of an interconnection matrix and two types of modules that can comprise large detector arrays.

In one embodiment and referring to FIG. 4, to reduce a total number of scan lines 98, 100, 102, 104, 106, 108, 110, 112, 114, 116, 118, 120, each scan line is operatively coupled to a plurality of detector elements 20 in a row. For example, scan line 98 is coupled to detector elements 20 in row 50 at columns 70, 72, 74, and 76. Thus, when scan line 98 is activated (or scanned), charges from these detector elements 20 are simultaneously transferred to a plurality of busses 90, 92, 94, and 96. Even though a plurality of detector elements 20 are scanned by each scan line, depending upon the electrical configuration of matrix 122 and its crosspoints 140, it remains possible in the illustrated embodiment to obtain individual attenuation measurements from each detector element 20 individually. Individual measurements are obtained, for example, by electrically configuring interconnection matrix 122 as shown in FIG. 4, and by activating each scan line 98, 100, 102, 104, 106, 108, 110, 112, 114, 116, 118, 120 in sequence.

More specifically, the attenuation measurement for detector cell 20 at row 50, column 70 appears on read-out line 124. Similarly, the attenuation measurement for detector cell 20 at row 50, column 72 appears on read-out line 126; for row 50, column 74, the measurement appears on read out-line 128; and for row 50, column 76, the measurement appears on read-out line 130. When scan line 100 is activated (i.e., scanned or strobed), the attenuation measurement for detector cell 20 at row 50, column 62 appears on read-out line 124. Similarly, the attenuation measurement for detector cell 20 at row 50, column 64 appears on read-out line 126; for row 50, column 66, the measurement appears on read out-line 128; and for row 50, column 68, the measurement appears on read-out line 130. Thus, one embodiment of the present invention is able to individually read each detector cell 20 even though having read-out lines less numerous than the number of detector cells, by appropriately configuring analog interconnection matrix 122 and sequentially scanning each scan lines. Such scanning results in multiplexing of attenuation measurements from different detector elements on selected read-out lines, and can be accomplished even in embodiments having scan lines operatively coupled to more than one detector element 20 in a row.

In one embodiment, scan lines are operatively coupled to a plurality of detector elements in a plurality of rows. For example, in one embodiment, scan lines 100, 104, 108, 112, 116, and 120 form a single scan line via a fixed or switchable electrical connection (not shown in FIG. 4), and scan lines 98, 102, 106, 110, 114, and 118 are similarly connected. Equivalently, sets of scan lines can be activated simultaneously to achieve the same result, which is the combination of attenuation data from a plurality of rows of detector array. Combining rows of attenuation data in this manner results in the acquisition of attenuation data representative of thicker slices (in a z-direction) of an object or patient 22 being scanned by imaging system 10.

Independently of the combination of row measurements, analog interconnection matrix 122 can be electrically configured to combine adjacent attenuation measurements by columns, i.e., in an x-direction, if desired. Thus, a selection of many combinations of thickness and in-plane resolution of reconstructed images is available in embodiments of the present invention. (In-plane resolution is measured by a number of independent attenuation measurements in the x-direction.) FIGS. 3 and 4 are representative of two of the configurations of analog interconnection matrix 122.

In one embodiment, computer 36 of imaging system 10 is configured to electrically activate different selected proper subsets of scan lines of detector array 18 in a sequence, and interconnection matrix 122 is configured by computer 36 to multiplex electrical charges from the busses to a proper subset less than an entirety of all of the read-out lines as the different selected proper subsets of scan lines are electrically activated. For example, and referring to FIG. 3, only those read-out lines 124, 126, 128 and 130 having crosspoints 140 that are switched "on" (as indicated by 142) transfer charges from detector array 18 to data acquisition system 32. By first electrically activating scan lines 98, 100, 102, 104, 106 and 108, and then electrically activating scan lines 110, 112, 114, 116, 118, and 120, busses 82, 84, 86, 88, 90, 92, 94, and 96 first transfer charges from rows 50, 52, and 54 to scan lines 124, 126, 128, and 130, and then transfer charges from rows 56, 58, and 60 to the same proper subset of scan lines. Repeated activation of the subsets of scan lines in the same sequence results in sequential multiplexing of charges from the indicated subset of rows onto the subset of scan lines. Outputs from various selectable proper subsets of detector elements 20 of detector array 18 can be thus be combined from a plurality of rows, multiplexed on a plurality of read-out lines, and the analog signals from the read-out lines read by DAS 32.

For descriptive purposes, matrix 122 is considered, by convention, to be a part of detector array 18. In at least one embodiment of the present invention, interconnection matrix 122 is physically conjoined with detector array 18, or in modules of detector array 18, or constructed on a circuit board or semiconductor of detector array 18.

As indicated above, interconnection matrix 122 is operatively coupled to 82, 84, 86, 88, 90, 92, 94 and 96 and to read out lines 124, 126, 128, 130, 132, 134, 136, 138. However, to reduce the size of matrix 122 in large detector arrays 18, not all possible crosspoints 140 (or crosspoint switches) are provided in matrix 122. Taking advantage of this reduction, one embodiment of a detector array 18 of the present invention is assembled from an array of modules. For example, and referring to FIG. 4, a first type of detector module 142 contains a portion 144 of analog interconnection matrix 122, as well as a portion of the electrically conductive busses, detector elements 20, and scan lines, and a portion or all of the read-out lines of the entire detector array 18. Such division is possible because portions 144 of analog interconnection matrix 122 of assembled detector array 18 in one module 142 need not have crosspoints 140 for electrically conductive busses from other modules 142. (In one embodiment, portions 144 of analog interconnection matrix 122 in a module 142 also do not have crosspoints 140 for all read-out lines of detector array 18, thereby further reducing the number of interconnections between modules 142.) Portion 144 of analog interconnection matrix 122 is, for example, a set of FET switches (for example, a monolithic array of FETs). To configure interconnection 15 matrix 122, computer 36 configures these sets of switches. A second type of detector module 146 is also shown that does not include any portion of analog interconnection matrix 122. One embodiment of detector array 18 includes only modules of the first type 142. Another embodiment includes modules of the first type 142 and of the second type 146. In most embodiments, detector array 18 and modules 142 and 146 are upwardly scaled versions of those represented in FIG. 4, i.e., they contain many more detector elements 20 and other associated components, and detector array 18 will contain many such modules. Once the structure of modules 142 and 146 are understood from this description, the size and aspect ratios of modules 142 and 146 in a particular embodiment of detector array 18 can be determined as a design choice.

Figure 5:
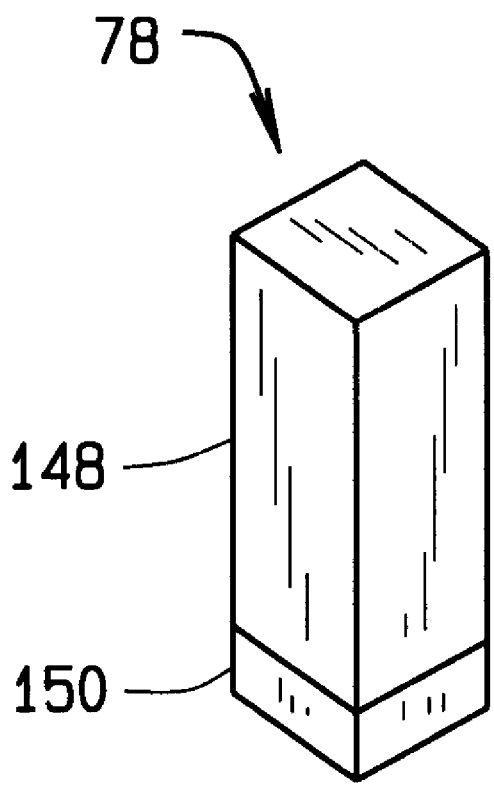
FIG. 5 is a perspective drawing of a single sensing element of the detector arrays of FIGS. 3 and 4.

In one embodiment and referring to FIG. 5, each sensing element 78 of a detector element 20 comprises a scintillator 148 and a photodetector 150 that is coupled to electronic switch 80 (not shown in FIG. 5) and that is responsive to light from scintillator 148. Suitable scintillators 148 include, but are not limited to, fiber optic scintillators, cesium iodide columnar grown scintillators, injection molded yttrium gadolinium oxide scintillators, gadolinium oxysulfide scintillators, and cadmium tungstate scintillators. Suitable photodetectors 150 include, for example, amorphous silicon diodes and single crystal silicon diodes. Photodetectors 150 and switches 80 of a module of either the first type 142 or the second type 146 or of an entire array 18 can, for example, be integrated on a single chip. Interconnection matrix 122 (or a portion thereof) can also be integrated on a portion of the same chip or can comprise a separate chip or chips.

Embodiments of the present invention offer many selectable combinations of slice thickness and in-plane resolutions, as well as a very fine detector element pitch and slice thickness, and thus can satisfy a broad range of CT application needs. For example, a detector array embodiment of the present invention could be used to scan various body parts with different, selectable resolutions, and to selectively vary resolutions without changing the data acquisition system or DAS data rates, simply by selecting a sequence and timing for scanning the detector elements and by appropriately configuring the interconnection matrix . Detector element pitches as small as 100 microns can be used to obtain high resolution. Such sizes are already available in scannable digital radiographic solid state mamography detectors.

It will be recognized that many additional equivalent embodiments of the present invention can be made in which the roles and/or directions of rows and columns of detector elements 20 are interchanged. In such embodiments, scan lines would be configured to scan detector elements 20 in a direction transverse to that in which they are illustrated in FIG. 3. In addition, busses would connect to rows rather than columns of detector elements. In choosing between such embodiments and those exemplified by FIG. 3, one would consider factors affecting the ease of implementation; for example, whether the detector array embodiment is to have more rows than columns or vice versa.

While the invention has been described in terms of various specific embodiments, those skilled in the art will recognize that the invention can be practiced with modification within the spirit and scope of the claims.

What is claimed is:

1. A detector array for an imaging system, said detector array comprising:
   a plurality of electrically conductive busses;
   a plurality of detector elements arranged in rows extending in an x-direction and columns extending in a z-direction;
   a plurality of scan lines, each operatively coupled to at least one said detector element so that electrical activation of a said scan line transfers an electrical charge from said at least one detector element onto one of said busses;
   a plurality of read-out lines; and
   an interconnection matrix operatively coupled to said busses and said read-out lines and electrically reconfigurable to transfer electrical charges from said busses selectively to said readout lines, said detector array further comprises a plurality of modules, including modules having some of said plurality of electrically conductive busses, some of said plurality of detector elements, some of said plurality of scan lines, some of said plurality of read-out lines, and a portion of said interconnection matrix.

2. A detector array in accordance with claim 1 wherein each said detector element comprises a scintillator, a photodetector responsive to light from said scintillator, and an electronic switch operatively coupled to one of said scan lines to discharge, onto one of said busses, an electrical charge from said photodetector indicative of light from said scintillator.

3. A detector array in accordance with claim 1 wherein each said scan line is operatively coupled to a plurality of detector elements in a row.

4. A detector array in accordance with claim 1 wherein said plurality of read-out lines is less numerous than said plurality of detector elements.

5. A detector array in accordance with claim 1 wherein said portion of said interconnection matrix comprises a field effect transistor (FET) array.

6. A detector array in accordance with claim 5 wherein each said detector element comprises a scintillator, a photodetector responsive to light from said scintillator, and an electronic switch operatively coupled to one of said scan lines to discharge, onto one of said busses, an electrical charge from said photodetector indicative of light from said scintillator.

7. A detector array in accordance with claim 6 wherein each said scintillator is a scintillator selected from the group consisting of fiber optic scintillators, cesium iodide columnar grown scintillators, injection molded yttrium gadolinium oxide scintillators, gadolinium oxysulfide scintillators, and cadmium tungstate scintillators.

8. A detector array in accordance with claim 6 wherein said photodetectors are selected from the group of amorphous silicon diodes and single crystal silicon diodes.

9. A detector array in accordance with claim 8 wherein said photodetectors are single crystal silicon diodes.

10. A computed tomographic imaging system for imaging an object, said imaging system comprising:
    a rotating gantry;
    a radiation source mounted on said rotating gantry;
    a detector array opposite said radiation source on said rotating gantry and configured to detect radiation emitted by said radiation source passing through an object disposed between said radiation source and said detector array; and
    a data acquisition system configured to acquire, from said detector array, signals indicative of attenuation of said radiation passing through the object;
    and wherein said detector array comprises a plurality of electrically conductive busses, a plurality of detector elements arranged in rows extending in an x-direction and columns extending in a z-direction, a plurality of scan lines, each operatively coupled to at least one said detector element so that electrical activation of a said scan line transfers an electrical charge indicative of said attenuation of said radiation from said at least one detector element onto one of said busses; a plurality of read-out lines operatively coupled to said data acquisition system; and an interconnection matrix operatively coupled to said busses and said read-out lines and electrically reconfigurable to transfer electrical charges from said busses selectively to said read-out lines.

11. An imaging system in accordance with claim 10 wherein each said detector element comprises a scintillator, a photodetector responsive to light from said scintillator, and an electronic switch operatively coupled to one of said scan lines to discharge, onto one of said busses, an electrical charge from said photodetector indicative of light from said scintillator.

12. An imaging system in accordance with claim 10 wherein each said scan line is operatively coupled to a plurality of detector elements in a row.

13. An imaging system in accordance with claim 10 wherein said plurality of read-out lines is less numerous than said plurality of detector elements.

14. An imaging system in accordance with claim 13 wherein said detector array comprises a plurality of modules, including modules having some of said plurality of electrically conductive busses, some of said plurality of detector elements, some of said plurality of scan lines, some of said plurality of read-out lines, and a portion of said interconnection matrix.

15. An imaging system in accordance with claim 14 wherein said portion of said interconnection matrix comprises a field effect transistor (FET) array.

16. An imaging system in accordance with claim 15 wherein each said detector element comprises a scintillator, a photodetector responsive to light from said scintillator, and an electronic switch operatively coupled to one of said scan lines to discharge, onto one of said busses, an electrical charge from said photodetector indicative of light from said scintillator.

17. An imaging system in accordance with claim 10 configured to electrically activate different selected proper subsets of scan lines in sequence and said interconnection matrix is configured to multiplex electrical charges from said busses on a proper subset less than an entirety of said read-out lines as said different selected proper subsets of scan lines are electrically activated.

18. A method for operating a detector array in a computed tomographic imaging system, the detector array having a plurality of detector elements arranged in a plurality of rows and columns, and the computed tomographic imaging system comprising a data acquisition system configured to acquire analog signals representative of attenuation measurements from the detector array, said method comprising the steps of:

on each of a plurality of busses, combining outputs from selected proper subsets of the detector elements from a plurality of the rows; and on each of a plurality of read-out lines, multiplexing a plurality of the combined outputs.

19. A method in accordance with claim 18, wherein said step of multiplexing a plurality of the combined outputs comprises the step of electrically configuring an array of switches.

20. A method in accordance with claim 19 wherein the switches are field effect transistor (FET) switches.

21. A method in accordance with claim 20 wherein the detector array comprises a plurality of modules, the array of switches comprises sets of switches in each of said modules, and said step of electrically configuring an array of switches comprises the step of electrically configuring the sets of switches.

22. A detector array for an imaging system comprising a scannable array of detector elements, a reconfigurable switch, and a set of read-out lines, said reconfigurable switch operatively coupled to said array of detector elements and said set of read-out lines to selectively and simultaneously multiplex combined signals from different groups of scanned detector elements on each of a selected subset of said read-out lines when said array of detector elements is scanned.

* * * * *